United States Patent
Zang et al.

(10) Patent No.: US 9,324,352 B1
(45) Date of Patent: Apr. 26, 2016

(54) LOCATION ASSOCIATION IDENTIFICATION BETWEEN WIRELESS COMMUNICATION DEVICES

(71) Applicant: Sprint Communications Company L.P., Overland Park, KS (US)

(72) Inventors: Hui Zang, Cupertino, CA (US); Phyllis J. Reuther

(73) Assignee: Sprint Communications Company L.P., Overland Park, KS (US)

( * ) Notice: Subject to any disclaimer, the term of this patent is extended or adjusted under 35 U.S.C. 154(b) by 399 days.

(21) Appl. No.: 13/660,812

(22) Filed: Oct. 25, 2012

(51) Int. Cl.
*H04W 4/02* (2009.01)
*G11B 5/66* (2006.01)

(52) U.S. Cl.
CPC ... *G11B 5/66* (2013.01); *H04W 4/021* (2013.01)

(58) Field of Classification Search
CPC ....... H04W 4/02; H04W 64/00; H04W 88/02; H04Q 7/02
See application file for complete search history.

(56) References Cited

U.S. PATENT DOCUMENTS

| | | | |
|---|---|---|---|
| 2007/0117572 A1 | 5/2007 | Adam et al. | |
| 2008/0188261 A1* | 8/2008 | Arnone | H04W 4/02 455/550.1 |
| 2012/0177025 A1* | 7/2012 | Huang | G01S 5/0236 370/342 |
| 2013/0267252 A1* | 10/2013 | Rosenberg | H04W 4/02 455/456.3 |

* cited by examiner

Primary Examiner — Myron K Wyche

(57) ABSTRACT

Embodiments disclosed herein provide systems and methods for identifying similarly located wireless devices. In a particular embodiment, a method provides processing location information that indicates past locations of the wireless communication devices to generate location profiles for the wireless communication devices. The method further provides processing groups of the location profiles to determine location-similarity metrics among the location profiles within the groups and determining if any of the location-similarity metrics for any of the groups satisfies a similarity criteria indicating similarly located devices. If one of the location-similarity metrics for one of the groups satisfies the similarity criteria, then the method provides generating device information indicating a location-association among the wireless communication devices that correspond to the location profiles in that one group.

16 Claims, 5 Drawing Sheets

| Wireless Device | 301 | 302 | 303 | 304 |
|---|---|---|---|---|
| Location | 323 (9) | 323 (7) | 321 (11) | 323 (11) |
| | 324 (3) | 324 (3) | 322 (8) | 324 (8) |
| | 321 (2) | 321 (2) | 324 (6) | 322 (6) |
| | ⋮ | ⋮ | ⋮ | ⋮ |

LOCATION PROFILE TABLE 500

FIGURE 5

LOCATION ASSOCIATION IDENTIFICATION BETWEEN WIRELESS COMMUNICATION DEVICES

TECHNICAL BACKGROUND

As wireless devices, such as cellphones, laptops, and tablets, become more prevalent, individual users may carry more than one device. For example, a user may have a cellphone for personal use as well as a cellphone for work use. Likewise, a user may carry one or more a cellphones and a tablet computer. Unless these devices are operated under a common account with a wireless network operator, the wireless network operator may have no knowledge that the same individual is carrying the wireless devices.

Knowledge of commonly carried wireless devices may be beneficial for a wireless network operator for user profiling, billing, and network management, among other possible uses. For example, a wireless network operator may be able to suggest to a customer that two or more commonly carried devices be put on a common service plan, which may save the customer money and streamline billing for the two devices. Similarly, such knowledge may allow a wireless network operator to offer solutions that would allow a customer with multiple cellphones to instead use a single cellphone for the same purposes.

OVERVIEW

Embodiments disclosed herein provide systems and methods for identifying similarly located wireless devices. In a particular embodiment, a method provides processing location information that indicates past locations of the wireless communication devices to generate location profiles for the wireless communication devices. The method further provides processing groups of the location profiles to determine location-similarity metrics among the location profiles within the groups and determining if any of the location-similarity metrics for any of the groups satisfies a similarity criteria indicating similarly located devices. If one of the location-similarity metrics for one of the groups satisfies the similarity criteria, then the method provides generating device information indicating a location-association among the wireless communication devices that correspond to the location profiles in that one group.

BRIEF DESCRIPTION OF THE DRAWINGS

FIG. 5 illustrates an exemplary location profile table for use when identifying similarly located wireless devices.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
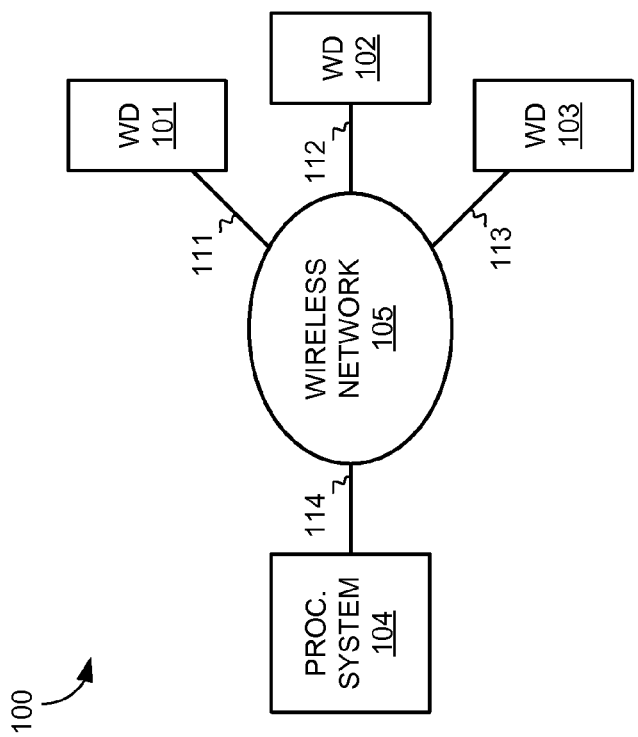
FIG. 1 illustrates a wireless communication system for identifying similarly located wireless devices.

FIG. 1 illustrates wireless communication system 100. Wireless communication system 100 includes wireless communication devices 101-103, data processing system 104, and wireless communication network 105. Wireless communication devices 101-103 and wireless communication network 105 communicate over wireless links 111-113, respectively. Data processing system 104 and wireless communication network 105 communicate over communication link 114.

In operation, wireless network 105 provides communication access to wireless devices 101-103. This access may include voice service and data access for data services, such as web browsing, email, VoIP, video call, messaging, application data, or any other type of data. Each of wireless devices 101-103 is associated with a wireless network operator. For example, the owner of a wireless device may be a customer of the wireless network operator and, therefore, pays the wireless network operator for wireless network access.

Wireless devices 101-103 may each be associated with a network operator that operates wireless network 105 or may be associated with another network operator and be roaming on wireless network 105. Regardless, any of wireless devices 101-103 may be associated with a common entity, such as a common user. For example, a single user may have multiple cellular phones, a cellular phone and a tablet, a cellular phone, tablet, and laptop, or any other possible combination of multiple wireless devices. If multiple wireless devices having a common entity are not under the same account with a wireless network operator, the wireless network operator may not recognize the association between the multiple devices.

Figure 2:
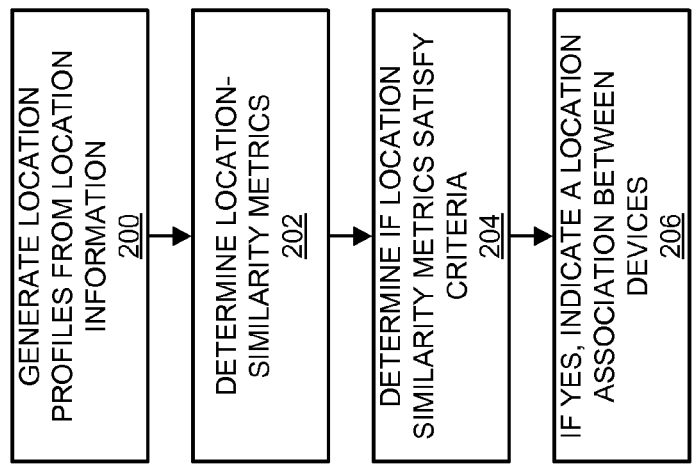
FIG. 2 illustrates the operation of the wireless communication system for identifying similarly located wireless devices.

FIG. 2 illustrates the operation of wireless communication system 100 to identify similarly located wireless devices. Location information that indicates past locations of wireless devices 101-103 is processed to generate location profiles for wireless devices 101-103 (step 200). The location information is processed by data processing system 104. Data processing system 104 may be an individual system on wireless network 105 or the functionality of data processing system 104 may be incorporated into another system on wireless network 105, such as a mobile switching center (MSC), authentication, authentication, and accounting (AAA) server, home location register (HLR), or any other system on wireless network 105.

The location information for each device may take any form including geographic coordinates, base station identifiers, cell sector identifiers, or any other form of denoting location. Preferably, the location information comprises a discrete location, as is the property of a base station or cell sector identifier. Alternatively, geographic coordinate ranges may be segmented into discrete locations. Thus, any geographic coordinate that falls into a particular range is considered part of the corresponding discrete location.

The location information may be obtained from each of wireless devices 101-104 or may be obtained from other network elements, such as base stations, base station controllers, MSCs, or some other element of wireless network 105.

For example, geographic coordinates may be obtained from wireless device 301 while base station or cell sector identifiers may be obtained from the base station serving the wireless device. Each time location information is obtained by data processing system 104 for a particular wireless device, the information is added to a location profile for that device.

In some embodiments, location information is obtained by data processing system 104 when each of wireless devices 101-103 participates in a data session. In those embodiments, every time one of wireless devices 101-104 requests a data session the location information for that wireless device is obtained by processing system 104. The location information may be contained in the data request itself or transferred separately to data processing system 104 automatically or by request.

In an alternative embodiment, the location information is obtained by data processing system 104 when each of wireless devices 101-103 participates in a voice call. This approach may generate less location information than if the location information were obtained during each data session due to modern wireless devices' proclivity towards data communications. In a further embodiment, data processing system 104 may obtain location information for each of wireless devices 101-104 periodically based on a desired amount of location information for each device when used for processing as described below.

The location profiles are generated from the obtained location information. Each of wireless devices 101-104 is associated with its own location profile. The location profile for a wireless device contains at least some of the location information obtained for the wireless device in order to represent past locations for the wireless device. The location information contained in the location profile may include location information going back a certain amount of time, i.e. location information for the past two weeks, but may instead include all location information collected for a wireless device. Additionally, the location information may include a time metric associated with each location. Accordingly, each entry in a location profile for a wireless device may include both a location for the wireless device and a time metric associated with that location. The time metric may include a time when the wireless device is observed at the location, the amount of time the wireless device is observed at the location, the number of observations of the wireless device at that location, or the fraction of observations of the wireless device at the location.

Groups of the location profiles are processed to determine location-similarity metrics among the location profiles within the groups (step 202). The groups may include any number of location profiles that are determined for corresponding wireless devices. A group may comprise location profiles for all of wireless devices 101-103 or location profiles for just two of wireless devices 101-103. It should further be understood that wireless network 105 may serve additional wireless devices. Thus, location profiles that are obtained and processed for those devices may also be included in groups with the location profiles for wireless devices 101-103.

The location-similarity metrics may be any indicator of how a wireless device may be similarly located to another wireless device or devices. The location-similarity metrics may be based solely on past locations contained in the location profiles but may be further based on times associated with the past locations, radius of gyration for the past locations, entropy of the past locations, or any other measure that can be derived from the past locations included in the location profiles.

In some embodiments, the location-similarity metric may be the number of past locations in the location profiles that match between two or more location profiles. Locations may be considered matching locations if the geographic area, base station identifier, or cell sector identifier are the same between the two or more location profiles. Likewise, if the location profiles include geographic coordinates then the locations would be considered matching locations if the geographic coordinates contained in the two or more location profiles are within a threshold distance from each other.

In further embodiments, the location-similarity metric may be the number of top (most visited) locations that match, in order, between two or more location profiles. For example, the top 8 locations may match between two location profiles. In yet further embodiments, locations may only be considered as matching locations if the times at which the matching locations were obtained is within a threshold value of time.

In further embodiments, the location-similarity metric may be the Cosine Similarity Score or Jaccard Similarity Score between the distributions of number of observations or distributions of time observed of the two location profiles.

In further embodiments, the location-similarity metric may be the complement of differences of entropy of locations or radius of gyration of locations. If two location profiles have entropies E1 and E2, radii of gyration of G1 and G2, then the location similarity metric can be defined as $1-[(E1-E2)/(E1+E2)]$, or $1-[(G1-G2)/(G1+G2)]$.

After determining the location similarity metrics, data processing system 104 determines if any of the location-similarity metrics for any of the groups satisfies a similarity criteria indicating similarly located devices (step 204). The similarity criteria indicates a value that the location-similarity metrics should satisfy to consider the corresponding wireless devices similarly located. Thus, the similarity criteria may be a threshold value that the location-similarity metrics should meet or exceed to trigger an indication of similarly located devices.

In an example, the similarity criteria may indicate a number of locations, or number of top locations as described above, that should match between the locations in location profiles in order to satisfy the similarity criteria. For instance, if the location-similarity metrics indicate the number of top locations that match within a group of location profiles, then the similarity criteria may indicate a number of matching top locations required for a particular location-similarity metric to satisfy the similarity criteria. In an alternative example, the similarity criteria may indicate threshold values of entropy or radius of gyration differences between the locations in the location profiles.

If one of the location-similarity metrics for one of the groups satisfies the similarity criteria, then device information is generated indicating a location-association among the wireless communication devices that correspond to the location profiles in that one group (step 206). As discussed above, satisfaction of the similarity criteria indicates that the wireless devices in the one group are similarly located. From this information, data processing system 104 indicates a location-association between the wireless devices. For example, if a group comprising all of wireless devices 101-103 satisfies the similarity criteria, then data processing system 104 indicates that wireless devices 101-103 have a location-association.

Data processing system 104 may maintain a data structure that indicates wireless devices having a location-association, may provide an indication of the location-association to another system so that the other system can take action based on the indication, provide an indication to an administrator of wireless network 105, or any other method of indicating a property of a wireless device group—including combinations thereof.

Advantageously, knowledge of wireless devices having a location-association may allow a network operator to perform various actions relating to user profiling, billing, network management, or any other action that may benefit from such knowledge. For example, the same user may operate wireless devices with a location-association. If those wireless devices are not associated for billing purposes, then the operator of wireless network 105 may be able to offer the user a new service plan that covers both devices. In some embodiments, the network operator may wish to confirm that the location-associated devices are in fact carried by a common user before performing any actions based on an assumption.

Referring back to FIG. 1, wireless communication devices 101-103 each comprise Radio Frequency (RF) communication circuitry and an antenna. The RF communication circuitry typically includes an amplifier, filter, modulator, and signal processing circuitry. Wireless communication devices 101-103 may also include a user interface, memory device, software, processing circuitry, or some other communication components. Wireless communication devices 101-103 may each be a telephone, computer, e-book, mobile Internet appliance, wireless network interface card, media player, game console, or some other wireless communication apparatus—including combinations thereof.

Data processing system 104 comprises a computer system and communication interface. Data processing system 104 may also include other components such a router, server, data storage system, and power supply. Data processing system 104 may reside in a single device or may be distributed across multiple devices. Data processing system 104 is shown externally to wireless network 105, but system 104 could be integrated within the components of wireless network 105. Data processing system 104 could be a mobile switching center, MSC, AAA, HLR, network gateway system, Internet access node, application server, service node, or some other communication system—including combinations thereof.

Wireless communication network 105 comprises network elements that provide communications services to wireless devices 101-103. Wireless communication network 105 may comprise switches, wireless access nodes, Internet routers, network gateways, application servers, computer systems, communication links, or some other type of communication equipment—including combinations thereof.

Wireless links 111-113 uses the air or space as the transport media. Wireless links 111-113 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 114 uses metal, glass, air, space, or some other material as the transport media. Communication link 114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 114 could be a direct link or may include intermediate networks, systems, or devices.

Figure 3:
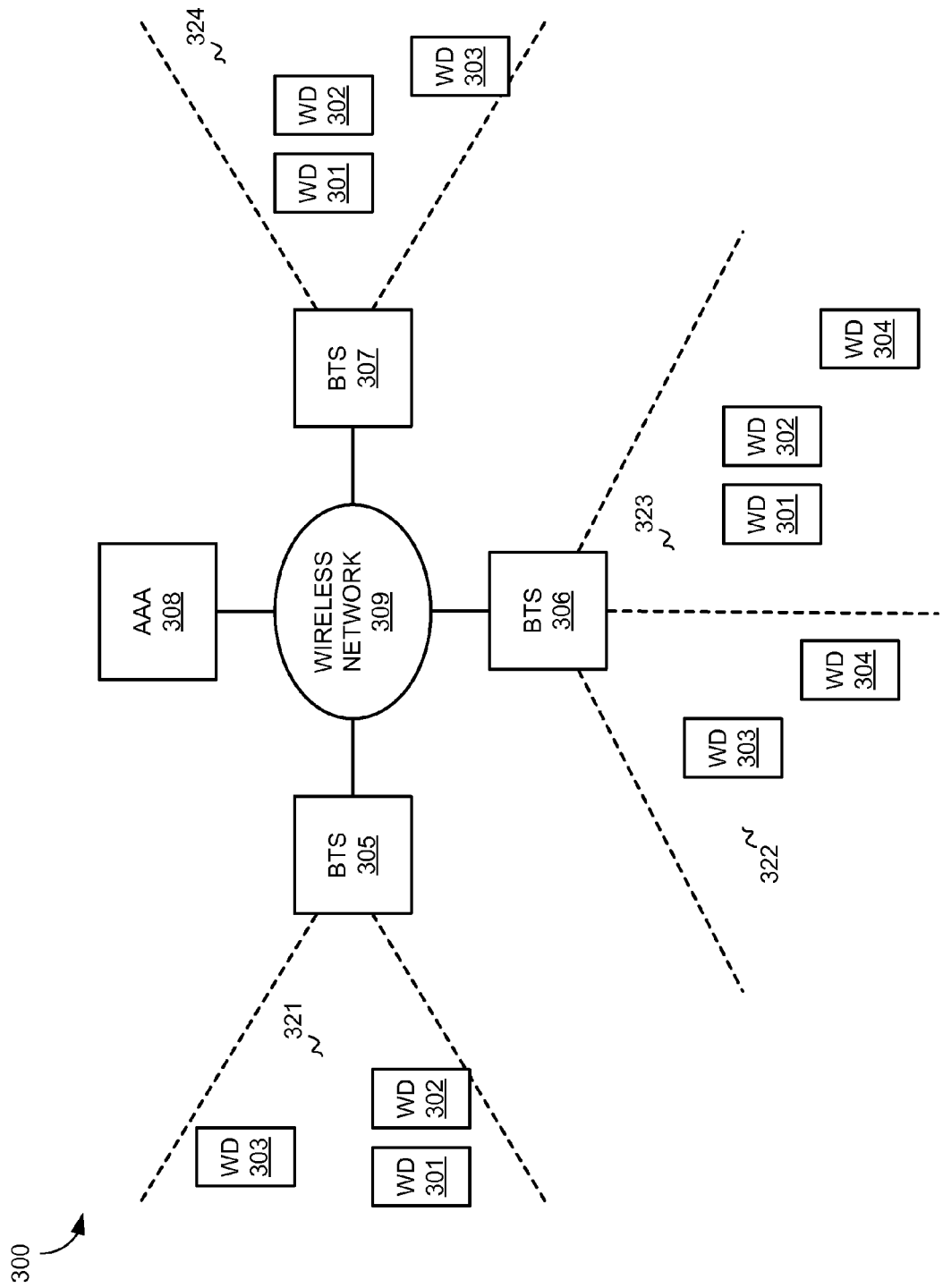
FIG. 3 illustrates a wireless communication system for identifying similarly located wireless devices.

FIG. 3 illustrates wireless communication system 300. Wireless communication system 300 includes wireless communication devices 301-304, base transceiver stations (BTSs) 305-307, authentication, authentication, and accounting (AAA) server 308, and wireless communication network 309. Cellular sector 321 is provided by BTS 305. Cellular sectors 322-323 are provided by BTS 306. Cellular sector 324 is provided by BTS 307. It should be understood that BTSs 305-307 may provide additional cellular sectors to those illustrated in FIG. 3. Likewise, wireless network 309 may include additional BTSs than those shown in FIG. 3.

Figure 4:
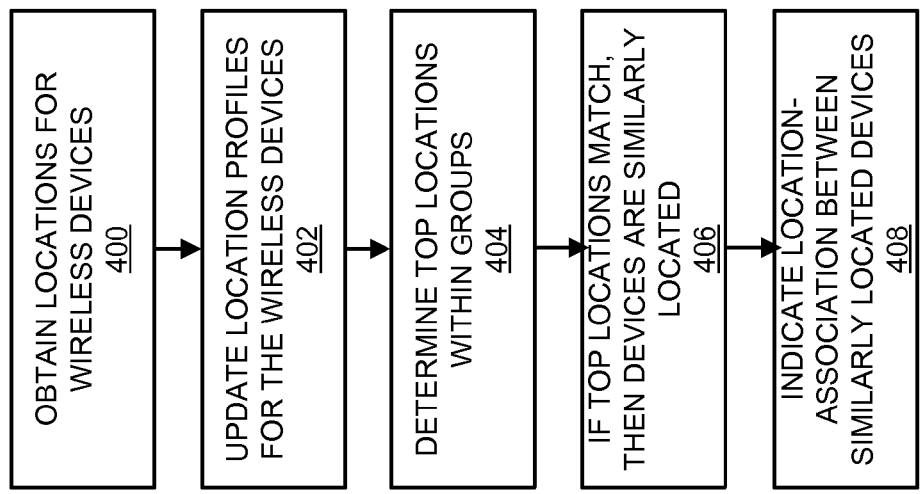
FIG. 4 illustrates the operation of the wireless communication system for identifying similarly located wireless devices.

FIG. 4 illustrates the operation of wireless communication system 300 to identify similarly located wireless devices. In operation, AAA server 308 determines whether a wireless device is allowed to access data services on wireless network 309. This is true whether or not a wireless device is roaming on wireless network 309. When a wireless device requests an access channel to exchange data communications over wireless network 309, the access request indicates a cell sector from where the requesting wireless device transferred the request. AAA server 308 is therefore able to obtain locations for wireless devices 301-304 when each of wireless devices 301-304 request data access from wireless network 309 (step 400).

After AAA server 308 receives a location for one of wireless devices 301-304, AAA server 308 adds that location to a location profile for the wireless device. AAA server 308 may add every location received for a wireless device or may limit the number of locations that are added to the location profile for the wireless device. For example, a location may only be added to the location profile if the location is different than the location most recently added to the location profile. Alternatively, or additionally, a location may only be added to the profile once during a given amount of time, such as once per hour.

FIG. 5 illustrates location profile table 500, which is a representation of a data structure that may be used by AAA server 308 to maintain location profiles for each of wireless devices 301-304. Table 500 lists the locations added by AAA server 308 in order of most entries with locations having the most entries at the top. Cell sectors 321-324 represent the location entries for wireless devices 301-304, which corresponds to the locations of wireless devices 301-304 shown in FIG. 3. The number in parentheses represents the number of times a particular location has been added to the location profile. In this example, table 500 provides that the location profile for wireless device 301 indicates that AAA server 308 added the location corresponding to cell sector 323 nine times. Likewise, AAA server 308 added cell sector 324 three times and cell sector 321 two times. The location profile may further include additional locations for wireless device 301 that are not shown for clarity.

Referring back to FIG. 4, AAA server 308 collects locations of wireless devices 301-304 for a period of time long enough so that the locations listed in each location profile provide a good representation of a wireless device's movements. The period of time, therefore, may be any amount of time deemed sufficient to track movement of a wireless device. For example, a week long period of time allows for AAA server 308 to collect locations for wireless devices over work days as well as weekend days. Likewise, a month long period of time may account for any discrepancies in an individual week, such as a user being away on vacation.

After the period of time, AAA server 308 determines location-similarity metrics for groups of the location profiles listed in table 500. Each group may include the location profiles for all of wireless devices 301-304, only three of the wireless devices 301-304, or only two of wireless devices 301-304. In this embodiment, the location-similarity metric between location profiles is determined as the number of top locations, in order, that match between each profile (step 404). Accordingly, the group comprising wireless devices 301 and 302 has a metric of three since both location profiles have cell sector 323 followed by 324 and 321 as top locations listed in order. The group comprising wireless devices 301 and 304 has a metric of two while the group comprising wireless devices 302 and 304 has a metric of zero since not even the top most location of the two profiles matches. Similar metrics are determined by AAA 308 for all possible groups of location profiles for wireless devices 301-304.

Once the location metrics are determined for the groups of location profiles, AAA server 308 compares the location metrics to a threshold number of top locations to determine whether the devices are similarly located (step 406). In this example, the threshold number of top locations is three and the location metrics for each group of location profiles must meet or exceed three to consider the corresponding wireless devices as similarly located. Using the metrics determined above, the group comprising the location profiles for wireless devices 301 and 302 is the only group with three or more matching top locations.

Therefore, AAA server 308 indicates that wireless devices 301 and 302 have a location-association (step 408). AAA server 308 may indicate the location-association in a field of table 500, indicate the association in a separate data structure, transfer the indication to another system for processing, provide the indication to a network administrator, or any other way that an indication of location-association could be performed. AAA server 308 may periodically perform the method of FIG. 4 to determine further location-associated devices. For each iteration, AAA server 308 may generate new location profiles or may continue adding locations to the location profiles in table 500.

In some embodiments, AAA server 308 may add a time for each location entry in table 500. Thus, when determining whether the number of top locations match between location profiles, AAA server 308 may only use locations entered into table 500 within a threshold amount of time. The time threshold accounts for the possibility that a matching location at a remote time is not a good indicator of commonly carried devices.

Figure 6:
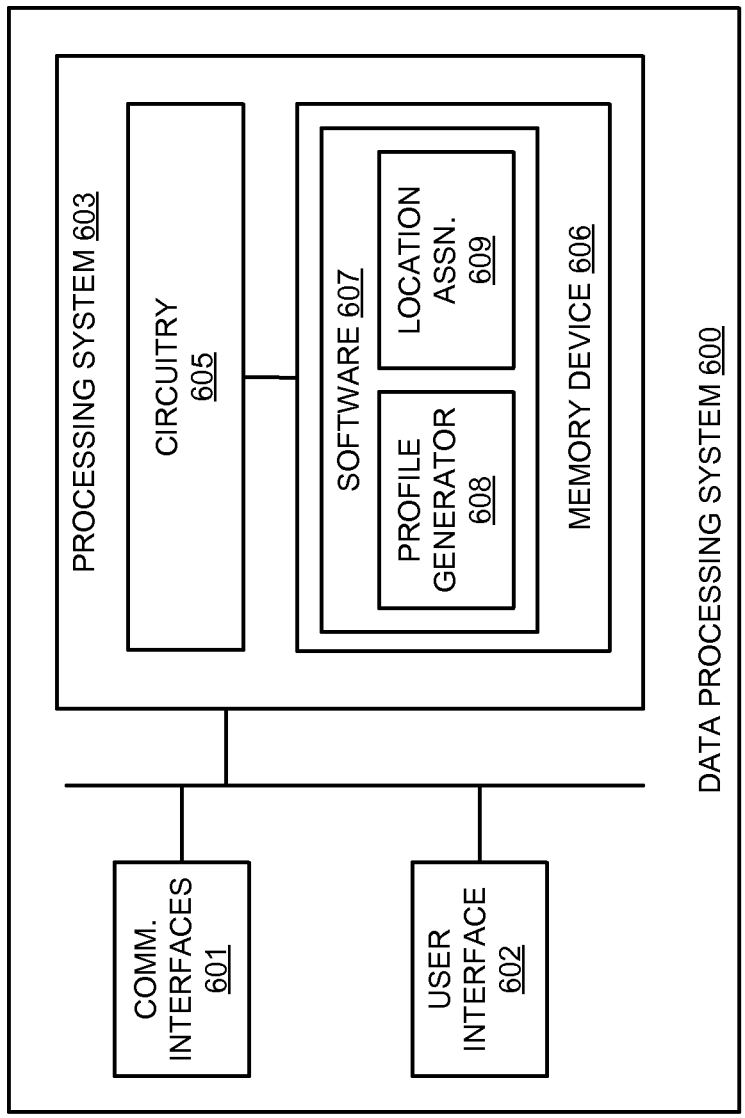
FIG. 6 illustrates a data processing system for identifying similarly located wireless devices.

FIG. 6 illustrates data processing system 600. Data processing system 600 is an example of data processing system 104, although data processing system 104 may use alternative configurations. Data processing system 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Operating software 607 comprises computer programs, firmware, or some other form of machine-readable processing instructions. Operating software 607 includes location profile generation module 608 and location association module 609. Operating software 607 may further include an operating system, utilities, drivers, network interfaces, applications, or some other type of software. When executed by circuitry 605, operating software 607 directs processing system 603 to operate data processing system 600 as described herein.

In particular, location profile generation module 608 directs processing system 603 to process location information that indicates past locations of wireless communication devices to generate location profiles for the wireless communication devices. Location association module 609 directs processing system 603 to process groups of the location profiles to determine location-similarity metrics among the location profiles within the groups and determine if any of the location-similarity metrics for any of the groups satisfies a similarity criteria indicating similarly located devices. If one of the location-similarity metrics for one of the groups satisfies the similarity criteria, then location association module 609 directs processing system 603 to generate device information indicating a location-association among the wireless communication devices that correspond to the location profiles in that one group.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data processing system for a wireless communication system serving a plurality of wireless communication devices, comprising:
   processing location information that indicates past locations of the wireless communication devices to generate location profiles for the wireless communication devices;
   processing groups of the location profiles to determine location-similarity metrics among the location profiles within the groups;
   determining if any of the location-similarity metrics for any of the groups satisfies a similarity criteria indicating similarly located devices, wherein the similarity criteria is satisfied when a number of location matches between the location profiles is above a threshold; and
   if one of the location-similarity metrics for one of the groups satisfies the similarity criteria, then generating device information indicating a location-association among the wireless communication devices that correspond to the location profiles in that one group.

2. The method of claim 1, wherein the number of location matches comprises a number of most listed past location entries that match in order from most visited to less visited.

3. The method of claim 1, wherein each location profile further indicates a time corresponding to each of the past location entries and the number of location matches comprises a number of past location entries that match with corresponding time metrics within a threshold time.

4. The method of claim 1, wherein the location metric is further based on at least one of entropy and radius of gyration of the past location entries.

5. The method of claim 1, wherein the location information is determined when each of the wireless communication devices participates in a voice call.

6. The method of claim 1, wherein the location information is determined when each of the wireless communication devices participates in a data session.

7. The method of claim 1, wherein the location information includes a base station identifier.

8. The method of claim 1, wherein the location information includes a cell sector identifier.

9. A data processing system for a wireless communication system serving a plurality of wireless communication devices, comprising:
   a communication interface configured to receive location information that indicates past locations of the wireless communication;
   a processing system configured to process the location information to generate location profiles for the wireless communication devices, process groups of the location profiles to determine location-similarity metrics among the location profiles within the groups, determine if any of the location-similarity metrics for any of the groups satisfies a similarity criteria indicating similarly located devices, wherein the similarity criteria is satisfied when a number of location matches between the location profiles is above a threshold, and, if one of the location-similarity metrics for one of the groups satisfies the similarity criteria, then generate device information indicating a location-association among the wireless communication devices that correspond to the location profiles in that one group.

10. The data processing system of claim 9, wherein the number of location matches comprises a number of most listed past location entries that match in order from most visited to less visited.

11. The data processing system of claim 9, wherein each location profile further indicates a time metric corresponding to each of the past location entries and the number of location matches comprises a number of past location entries that match with corresponding time metrics within a threshold time.

12. The data processing system of claim 9, wherein the location metric is further based on at least one of entropy and radius of gyration of the past location entries.

13. The data processing system of claim 9, wherein the location information is received when each of the wireless communication devices participates in a voice call.

14. The data processing system of claim 9, wherein the location information is received when each of the wireless communication devices participates in a data session.

15. The data processing system of claim 9, wherein the location information includes a base station identifier.

16. The data processing system of claim 9, wherein the location information includes a cell sector identifier.

* * * * *